United States Patent
Nakao et al.

(10) Patent No.: US 9,999,036 B2
(45) Date of Patent: *Jun. 12, 2018

(54) BASE STATION APPARATUS, COMMUNICATION METHOD, TERMINAL APPARATUS AND INTEGRATED CIRCUIT

(71) Applicant: Sun Patent Trust, New York, NY (US)

(72) Inventors: Seigo Nakao, Singapore (SG); Akihiko Nishio, Osaka (JP); Daichi Imamura, Beijing (CN); Takahisa Aoyama, Kanagawa (JP)

(73) Assignee: Sun Patent Trust, New York, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/966,278

(22) Filed: Dec. 11, 2015

(65) Prior Publication Data

US 2016/0128035 A1  May 5, 2016

Related U.S. Application Data

(60) Continuation of application No. 14/334,499, filed on Jul. 17, 2014, now Pat. No. 9,240,873, which is a (Continued)

(30) Foreign Application Priority Data

Oct. 31, 2008 (JP) .................. 2008-281388
Mar. 30, 2009 (JP) .................. 2009-083043

(51) Int. Cl.
*H04W 72/04* (2009.01)
*H04L 5/00* (2006.01)
(Continued)

(52) U.S. Cl.
CPC ........... *H04W 72/042* (2013.01); *H04L 1/004* (2013.01); *H04L 5/001* (2013.01); *H04L 5/003* (2013.01);
(Continued)

(58) Field of Classification Search
CPC ... H04L 47/36–47/365; H04L 1/0007–1/0008;
(Continued)

(56) References Cited

U.S. PATENT DOCUMENTS 8,108,757 B2   1/2012  Ahn et al.
2004/0180679 A1*  9/2004  Porter .................. H04L 1/1628
                                                              455/502
(Continued)

FOREIGN PATENT DOCUMENTS

CN   101267654 A   9/2008
EP   1 850 621 A2  10/2007

OTHER PUBLICATIONS

3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, pp. 1-77.
(Continued)

*Primary Examiner* — Andrew W Chriss
*Assistant Examiner* — Kenan Cehic
(74) *Attorney, Agent, or Firm* — Seed IP Law Group LLP

(57) ABSTRACT

Provided are a radio terminal device, a radio base station device, and a channel signal forming method which can prevent quality degradation of the downlink resource allocation information by reducing the frequency of the zero information addition process to the downlink resource allocation information when executing communication using an uplink unit band and multiple downlink unit bands correlated to the uplink unit band. A base station includes: a PDCCH generation unit which includes the uplink allocation information relating to the uplink unit band only in some of the channel signals formed for each of the downlink unit bands; and a padding unit which adds zero information to the downlink allocation information only in the selected
(Continued)

some channel signals having the bandwidth of the corresponding downlink unit band smaller than that of the uplink unit band until the downlink allocation information size becomes equal to the uplink allocation information size.

16 Claims, 10 Drawing Sheets

Related U.S. Application Data continuation of application No. 14/012,856, filed on Aug. 28, 2013, now Pat. No. 8,817,819, which is a division of application No. 13/125,422, filed as application No. PCT/JP2009/005788 on Oct. 30, 2009, now Pat. No. 8,743,805.

(51) Int. Cl.
*H04W 28/06* (2009.01)
*H04L 1/00* (2006.01)

(52) U.S. Cl.
CPC .......... *H04L 5/0046* (2013.01); *H04L 5/0053* (2013.01); *H04L 5/0094* (2013.01); *H04W 28/06* (2013.01); *H04L 5/0007* (2013.01); *H04W 72/0453* (2013.01)

(58) Field of Classification Search
CPC ............ H04W 72/1278–72/1294; H04W 72/04–72/0433
USPC ................................. 370/310–350
See application file for complete search history.

(56) References Cited

U.S. PATENT DOCUMENTS

| | | |
|---|---|---|
| 2005/0213674 A1 | 9/2005 | Kobayashi |
| 2005/0288020 A1* | 12/2005 | Cho ............... H04W 16/10 455/436 |
| 2007/0140261 A1* | 6/2007 | Wang ............... H04L 1/0003 370/395.42 |
| 2008/0137594 A1* | 6/2008 | Roh ............... H04L 1/1812 370/328 |
| 2009/0046649 A1 | 2/2009 | Gao et al. |
| 2009/0109915 A1 | 4/2009 | Pasad et al. |
| 2009/0219951 A1 | 9/2009 | Chun et al. |
| 2010/0034163 A1 | 2/2010 | Damnjanovic et al. |
| 2010/0146353 A1* | 6/2010 | Lim ............... H04L 5/0007 714/748 |
| 2011/0092242 A1 | 4/2011 | Parkvall et al. |
| 2012/0163330 A1 | 6/2012 | Mitra et al. |
| 2012/0263134 A1* | 10/2012 | Malladi ............ H04W 72/042 370/329 |
| 2013/0301578 A1 | 11/2013 | Terry |

OTHER PUBLICATIONS

3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, pp. 1-48.

3GPP TS 36.213 V8.3.0, "3rd Generation Partnership Project; Technical Specification Group Radio Access Network; Evolved Universal Terrestrial Radio Access (E-UTRA); Physical layer procedures (Release 8)," May 2008, pp. 1-45.

English Translation of Chinese Search Report dated Aug. 19, 2015, for corresponding CN Application No. 2013103151206, 2 pages.

Ericsson, "Carrier aggregation," R1-083750, 3GPP TSG-RAN WG1 #54bis, Sep. 29-Oct. 3, 2008, pp. 1-4.

Extended European Search Report, dated Jan. 21, 2014, for corresponding EP Patent Application No. 13180191.2-1854 / 2667657, 11 pages.

Huawei, "PDCCH on Carrier Aggregation," R1-083705, 3GPP TSG RAN WG1 meeting #54bis, Sep. 29-Oct. 3, 2008, pp. 1-3.

International Search Report dated Jan. 5, 2010.

LG Electronics, "Considerations on DL/UL Transmission in Asymmetric Carrier Aggregation," R1-084197, 3GPP TSG RAN WG1 Meeting #55, Nov. 10-14, 2008, pp. 1-5.

LTE downlink ACK channel mapping linked to CCE, R1-073106, Jun. 25-29, 2007, pp. 1-3.

Panasonic, "Support of UL/DL asymmetric carrier aggregation," R1-082999, 3GPP TSG RAN WG1 Meeting #54, Aug. 18-22, 2008, pp. 1-3.

Panasonic, "PHICH Linkage for asymmetric carrier aggregation," R1-090683, 3GPP TSG RAN WG1 Meeting #56, Feb. 9-13, 2009, pp. 1-3.

Qualcomm Europe, "Remaining issues on PDCCH formats and contents," R1-081479, 3GPP TSG-RAN WG1 #52bis, Mar. 31-Apr. 4, 2008, pp. 1-5.

Qualcomm Europe, "Notion of Anchor Carrier in LTE-A," R1-090860, 3GPP TSG RAN WG1 #56, Feb. 9-13, 2009, pp. 1-5.

Texas Instruments, "PDCCH Content and Formats," R1-081367, Agenda Item: 6.1.3, 3GPP TSG RAN WG1 52bis, Shenzhen, China, Mar. 31-Apr. 4, 2008, 6 pages.

Dverview of 3GPP Release 8 V0.0.5, 3GPP, Apr. 2009, pp. 1 and 125.

* cited by examiner

BASE STATION APPARATUS, COMMUNICATION METHOD, TERMINAL APPARATUS AND INTEGRATED CIRCUIT

TECHNICAL FIELD

The present invention relates to a radio terminal apparatus, a radio base station apparatus and a channel signal forming method.

DESCRIPTION OF THE RELATED ART

With 3GPP LTE, OFDMA (Orthogonal Frequency Division Multiple Access) is adopted as a downlink communication scheme. In a radio communication system supporting 3GPP LTE, a base station transmits synchronizing signals (synchronization channels: SCHs) and broadcast signals (broadcast channels: BCHs) using predetermined communication resources. Then, a terminal first captures an SCH to secure synchronization with the base station. Then, the terminal acquires parameters (e.g., a frequency bandwidth and so forth) unique to the base station by reading BCH information (see Non-Patent Literatures 1 and 2).

After completing acquisition of the parameters unique to the base station, the terminal requests the base station for a connection to establish communication with the base station. The base station transmits control information to the terminal having established communication with the base station using PDCCHs (physical downlink control channels) if necessary.

Then, the terminal performs "blind detection" on a received PDCCH signal. That is, a PDCCH signal contains a CRC part, and, in the base station, this CRC part is masked with the terminal ID of the terminal to which the PDCCH signal should be transmitted. Therefore, the terminal cannot determine whether or not the PDCCH signal is directed to the terminal until demasking the CRC part of the received PDCCH signal with the terminal's ID. With this blind detection, when CRC calculation is OK as the result of demasking, this PDCCH signal is determined as a signal directed to the terminal.

In addition, control information transmitted from a base station includes resource allocation information containing information about resources allocated from the base station to a terminal. A terminal needs to receive both downlink resource allocation information and uplink resource allocation information. These downlink resource allocation information and uplink resource allocation information are transmitted using PDCCH signals having the same size. A PDCCH signal contains the type information (e.g., one bit flag) about resource allocation information. Therefore, even if a PDCCH signal containing downlink resource allocation information and a PDCCH signal containing uplink resource allocation information have the same size, a terminal can distinguish between downlink resource allocation information and uplink resource allocation information by checking the type information about resource allocation information. Here, the format of PDCCHs used to transmit uplink resource allocation information is "PDCCH Format 0", and the format of PDCCHs used to transmit downlink resource allocation information is "PDCCH Format 1A."

However, a case is possible where the uplink bandwidth and the downlink bandwidth differ, and in this case, the size of information (that is, the number of bits required for transmission) is different between downlink resource allocation information and uplink resource allocation information. To be more specific, when the uplink bandwidth is small, the size of uplink resource allocation information is small, and, when the downlink bandwidth is small, the size of downlink resource allocation information is small. In this way, when the size of information varies due to a difference in bandwidth, zero information is added (that is, zero padding is performed) to either resource allocation information having a smaller size to make downlink resource allocation information and uplink resource allocation information have the same size. By this means, it is possible to keep the size of PDCCH signals the same regardless whether the information is downlink resource allocation information or uplink resource allocation information.

In addition, standardization of 3GPP LTE-Advanced that realizes communication faster than 3GPP LTE has been started. A 3GPP LTE-Advanced system (hereinafter, also referred to as "LTE-A system") follows a 3GPP LTE system (hereinafter, also referred to as "LTE system"). With 3GPP LTE-Advanced, base stations and terminals that can perform communication in a wideband frequency equal to or higher than 20 MHz, will be introduced in order to realize a downlink transmission speed equal to or higher than maximum 1 Gbps.

Moreover, with 3GPP LTE-Advanced, a case is possible where the communication bandwidth of the uplink is not symmetrical to the communication bandwidth of the downlink, taking into account that there is a difference in the required throughput between the uplink and the downlink. To be more specific, with 3GPP LTE-Advanced, the communication bandwidth of the downlink may be wider than the communication bandwidth of the uplink.

Here, a base station supporting an LTE-A system (hereinafter, "LTE-A base station") is configured to be able to perform communication using a plurality of "component bands." "Component band" is a band having a width of the maximum 20 MHz, and is defined as the basic unit of communication bands. In addition, "component band" in the downlink (hereinafter referred to as "downlink component band") may be defined as a band separated according to downlink frequency band information contained in a BCH broadcasted from a base station, or a band defined by the distribution width in which downlink control channels (PDCCHs) are distributed and assigned in the frequency domain. On the other hand, "component band" in the uplink (hereinafter "uplink component band") may be defined as a band separated according to uplink frequency band information contained in a BCH broadcasted from a base station, or the basic unit of communication bands equal to or lower than 20 MHz including a PUSCH (physical uplink shared channel) around the center and including PUCCHs in both end parts. Here, in 3GPP LTE-Advanced, "component band (s)" may be written as "component carrier(s)" in English.

FIG. 1 shows an arrangement example of channels in an LTE-A system where the communication bandwidth (the number of component bands) for the uplink is not symmetrical to the communication bandwidth for the downlink. In FIG. 1, in order to make a terminal transmit an uplink signal, an LTE-A base station reports resource allocation information from both two downlink component bands, using PDCCHs. The uplink component band is associated with both downlink component bands, and therefore a PUSCH is transmitted using the same uplink component band even if uplink resource allocation information is transmitted using either downlink component band. In addition, downlink resource allocation information may be transmitted from both of two downlink component bands, and each downlink resource allocation information is used to indicate, to a terminal, a downlink-allocated resource in the downlink component band from which the resource allocation information is transmitted.

An LTE-A terminal can receive a plurality of component bands by receiving resource allocation information in this way. Here, an LTE terminal can receive only one component band at a time in this way, bundling a plurality of component bands into an allocated band for a single communication is referred to as "carrier aggregation." It is possible to improve throughput using this carrier aggregation.

CITATION LIST

Non-Patent Literature

NPL 1
3GPP TS 36.211 V8.3.0, "Physical Channels and Modulation (Release 8)," May 2008
NPL 2
3GPP TS 36.212 V8.3.0, "Multiplexing and channel coding (Release 8)," May 2008
NPL 3
3GPP TS 36.213 V8.3.0, "Physical layer procedures (Release 8)," May 2008

BRIEF SUMMARY

Technical Problem

Here, in FIG. 1, the downlink communication bandwidth of an LTE-A system shown is 30 MHz, and includes two component bands including a downlink component band of 20 MHz in the low frequency side and a downlink component band of 10 MHz in the high frequency side. On the other hand, the uplink communication bandwidth is 20 MHz and includes one uplink component band.

In FIG. 1, the downlink component band in the low frequency side and the uplink component band have the same bandwidth, and therefore, with respect to this pair, uplink resource allocation information and downlink resource allocation information have the same size. Therefore, zero padding is not performed. By contrast with this, the downlink component band in the high frequency side and the uplink component band have different bandwidths, and therefore, with respect to this pair, zero information is added to the downlink resource allocation information having a smaller size until this downlink resource allocation information and the uplink resource allocation information have the same size. However, zero padding is performed for size adjustment, and zero information itself carries no meaning. That is, signals, which are actually unnecessary, are included in downlink control information, and therefore, when the power for the whole system is fixed, the power per information bit, which is actually necessary, decreases.

In addition, generally, the degree of importance of downlink control information is higher than that of uplink control information. It is because that downlink control information is used to report not only resource allocation information about downlink data channels, but also scheduling information about other important information (e.g., paging information and broadcast information). Therefore, it is desired to decrease the frequency of performing zero padding on downlink information.

Here, frequency diversity effect obtained using PDCCHs depends on the bandwidth of a downlink component band. Accordingly, the frequency diversity effect is small in a downlink component band having a narrow bandwidth, and therefore, it is desired to remove factors for quality deterioration as much as possible. However, when a downlink component band has a narrower bandwidth, the downlink component band is highly likely to be subject to zero padding.

This situation has not been impossible in an LTE system in which there is not concept of carrier aggregation, because the downlink frequency band is generally greater than the uplink frequency band in an LTE system. By contrast with this, in an LTE-A system in which carrier aggregation is introduced and a plurality of downlink component bands are associated with one uplink component band, even if the entire downlink frequency bandwidth is greater than the uplink frequency bandwidth, when each component band is focused on, a case is likely to frequently occur where a downlink component band is narrower than the uplink component band.

Moreover, in order to prevent zero padding, a case is possible where the size differs between uplink control information and downlink control information. However, in this case, the terminal side needs to perform blind detection separately on two pieces of control information having different numbers of information bits. Therefore, there is a problem of increase in the number of times of blind detections, and therefore the circuit scale increases.

It is therefore an object of the present invention to provide a radio terminal apparatus, a radio base station apparatus and a channel signal forming method that can prevent deterioration in the quality of downlink resource allocation information, by reducing the frequency of processing including adding zero information to downlink resource allocation information when performing communication using an uplink component band and a plurality of downlink component bands associated with the uplink component band.

Solution to Problem

The radio terminal apparatus according the present invention that can perform communication using an uplink component band and a plurality of downlink component bands associated with the uplink component band adopts a configuration to include: a radio receiving section that receives a control signal containing allocation information per downlink component band; and a control signal reception processing section that determines a basic information size used in reception processing on a control signal in each downlink component band and performs reception processing on the control signal based on the basic information size, wherein in a downlink component band containing uplink resource allocation information and downlink resource allocation information, the downlink component band being part of the plurality of downlink component bands, when an information size determined based on a bandwidth of a corresponding downlink component band is greater than an information size determined based on a bandwidth of the uplink component band, the basic information size is an information size determined based on the bandwidth of the downlink component band; when the information size determined based on the bandwidth of the corresponding downlink component band is smaller than the information size determined based on the bandwidth of the uplink component band, the basic information size is an information size determined based on the bandwidth of the uplink component band; and with respect to other downlink component bands, the basic information size is an information size determined based on the bandwidth of the downlink component band regardless of the bandwidth of the uplink component band.

The base station according to the present invention that can perform communication using an uplink component band and a plurality of downlink component bands associated with the uplink component band adopts a configuration to include: a forming section that forms a channel signal per downlink band; and a padding section that adds zero information to either downlink resource allocation information or uplink resource allocation information having a smaller size, in a channel signal containing both the downlink resource allocation information and the uplink resource allocation information until the downlink resource allocation information and the uplink resource allocation information have a same size, wherein the forming section includes both the uplink resource allocation information and the downlink resource allocation information in only part of the plurality of channel signals formed, and includes only the downlink resource allocation information in channel signals other than the part of the plurality of channel signals.

The channel signal forming method according to the present invention that forms channel signals containing downlink resource allocation information in an uplink component band and a plurality of downlink component band associated with the uplink component band, respectively, includes: putting uplink resource allocation information about the uplink component band in only part of the channel signals; and adding zero information to either downlink resource allocation information or uplink resource allocation information having a smaller size in a channel signal containing both the downlink resource allocation information and the uplink resource allocation information until the downlink resource allocation information and the uplink resource allocation information have a same size.

Advantageous Effects of Invention

According to the present invention, when communication is performed using an uplink component band and a plurality of downlink component bands associated with the uplink component band, the frequency of processing including adding zero information to downlink resource allocation information is reduced, and therefore, it is possible to provide a radio terminal apparatus, a radio base station apparatus and a channel signal forming method that can prevent deterioration in the quality of downlink resource allocation information.

DETAILED DESCRIPTION

Figure 1:
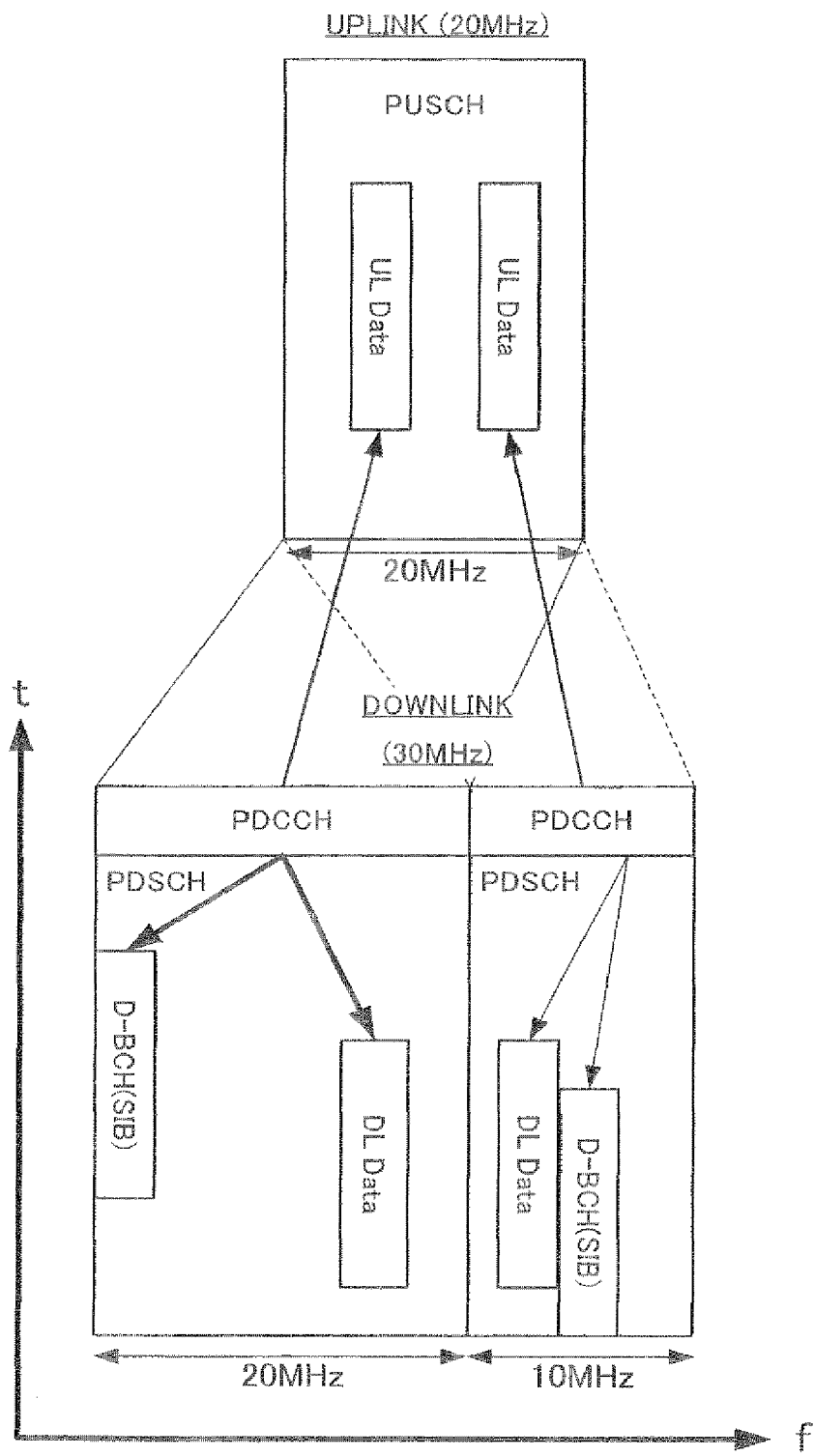
FIG. 1 shows an arrangement example of channels in an LTE-A system in which the communication bandwidth (the number of component bands) of the uplink is not symmetrical to that of the downlink.

Now, embodiments of the present invention will be described in detail with reference to the accompanying drawings. Here, the same components between embodiments are assigned the same reference numerals and overlapping descriptions will be omitted.

Embodiment 1

Figure 2:
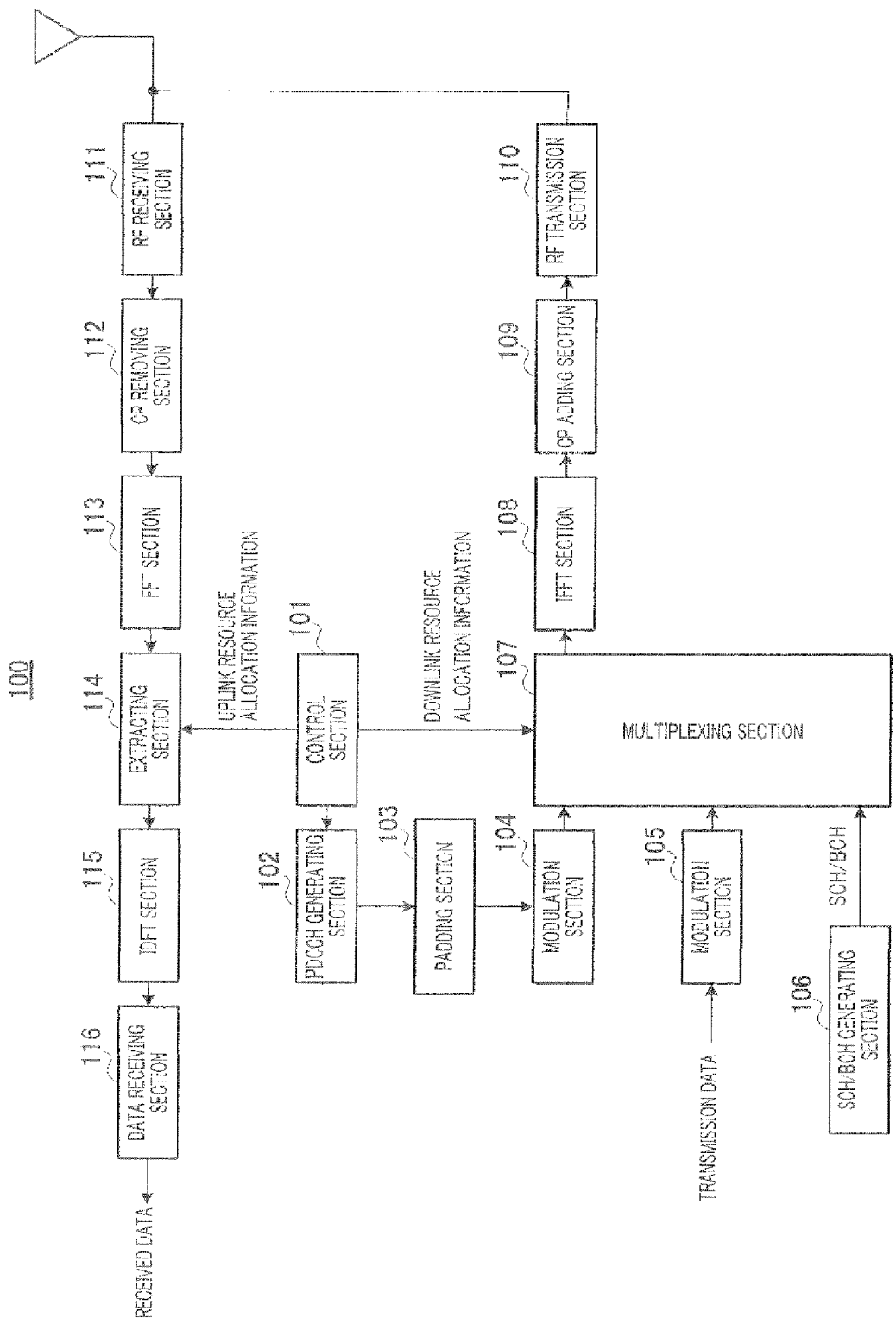
FIG. 2 is a block diagram showing a configuration of a base station according to Embodiment 1 of the present invention.

FIG. 2 is a block diagram showing the configuration of base station 100 according to Embodiment 1 of the present invention. In FIG. 2, base station 100 has control section 101, PDCCH generating section 102, padding section 103, modulation sections 104 and 105, SCH/BCH generating section 106, multiplexing section 107, IFFT section 108, CP (cyclic prefix) adding section 109, RF transmission section 110, RF receiving section 111, CP removing section 112, FFT section 113, extracting section 114, IDFT section 115 and data receiving section 116. Base station 100 is configured to be able to perform communication using an uplink component band and a plurality of downlink component bands associated with the uplink component band.

Control section 101 generates uplink resource allocation information and downlink resource allocation information for terminal 200 described later, outputs uplink resource allocation information to PDCCH generating section 102 and extracting section 114 and outputs downlink resource allocation information to PDCCH generating section 102 and multiplexing section 107.

Control section 101 allocates downlink resource allocation information to all of a plurality of downlink component bands, and allocates uplink resource allocation information to only part of the plurality of downlink component bands. Here, among a plurality of downlink component bands associated with one uplink component band, uplink resource allocation information is allocated to, particularly, the downlink component band having the bandwidth which is the most similar to the bandwidth of the uplink component band. Hereinafter, a target downlink component band to which uplink resource allocation information is allocated, may also be referred to as "basic component band."

Control section 101 outputs uplink resource allocation information and downlink resource allocation information to PDCCH generating section 102, and also outputs information about a basic component band (hereinafter may also be referred to as "basic component band information") to PDCCH generating section 102. Here, SCH/BCH generating section 106 may include this basic component band information in a BCH.

In addition, control section 101 delivers bandwidth comparison information indicating size comparison between the bandwidth of a basic component band and the bandwidth of an uplink component band, to padding section 103 via PDCCH generating section 102.

PDCCH generating section 102 generates a PDCCH signal to be transmitted in each downlink component band. In this case, PDCCH generating section 102 includes uplink resource allocation information and downlink resource allocation information in the PDCCH signal assigned to the downlink component band indicated by basic component band information, and includes only downlink resource allocation information in the PDCCH signal assigned to the other downlink component band. After that, the PDCCH signals are outputted to padding section 103.

Padding section 103 adds zero information to either downlink resource allocation information or uplink resource allocation information having the smaller size until the downlink resource allocation information and the uplink resource allocation information have the same size in the inputted PDCCH signals. To which of downlink resource allocation information or uplink resource allocation information is added zero information, is determined based on bandwidth comparison information.

In addition, padding section 103 adds CRC bits to a PDCCH signal after padding processing and masks the CRC bits with the terminal ID. Then, padding section 103 outputs a PDCCH signal after masking, to modulation section 104.

Modulation section 104 modulates the PDCCH signal inputted from PDCCH generating section 102, and outputs a PDCCH signal after modulation to multiplexing section 107.

Modulation section 105 modulates inputted transmission data (downlink data) and outputs a transmission data signal after modulation to multiplexing section 107.

SCH/BCH section 106 generates an SCH and a BCH, and outputs the generated SCH and BCH to multiplexing section 107.

Multiplexing section 107 multiplexes the PDCCH signal inputted from modulation section 104, the data signal (i.e., PDSCH signal) inputted from modulation section 105, and the SCH and BCH inputted from SCH/BCH generating section 106. Here, multiplexing section 107 maps a data signal (PDSCH signal) to downlink component bands, based on downlink resource allocation information inputted from control section 101.

IFFT section 108 transforms a multiplexed signal to time waveform, and CP adding section 109 adds a CP to this time waveform to generate an OFDM signal.

RF transmission section 110 applies transmission radio processing (up-conversion, digital-to-analog (D/A) conversion and so forth) to the OFDM signal inputted from CP adding section 109, and transmits the result via an antenna. By this means, an OFDM signal containing resource allocation information is transmitted.

RF receiving section 111 applies reception radio processing (down-conversion, analog-to-digital (A/D) conversion and so forth), to a received radio signal received in a receiving band via an antenna, and outputs a resultant received signal to CP removing section 112.

CP removing section 112 removes the CP from the received signal, and FFT section 113 transforms a received signal without a CP to a frequency domain signal.

Extracting section 114 extracts uplink data from the frequency domain signal inputted from FFT section 113, based on uplink resource allocation information inputted from control section 101. IDFT (inverse discrete Fourier transform) section 115 transforms an extracted signal to a time domain signal and outputs the time domain signal to data receiving section 116.

Data receiving section 116 decodes the time domain signal inputted from IDFT section 115. Then, data receiving section 116 outputs uplink data after decoding as received data.

Figure 3:
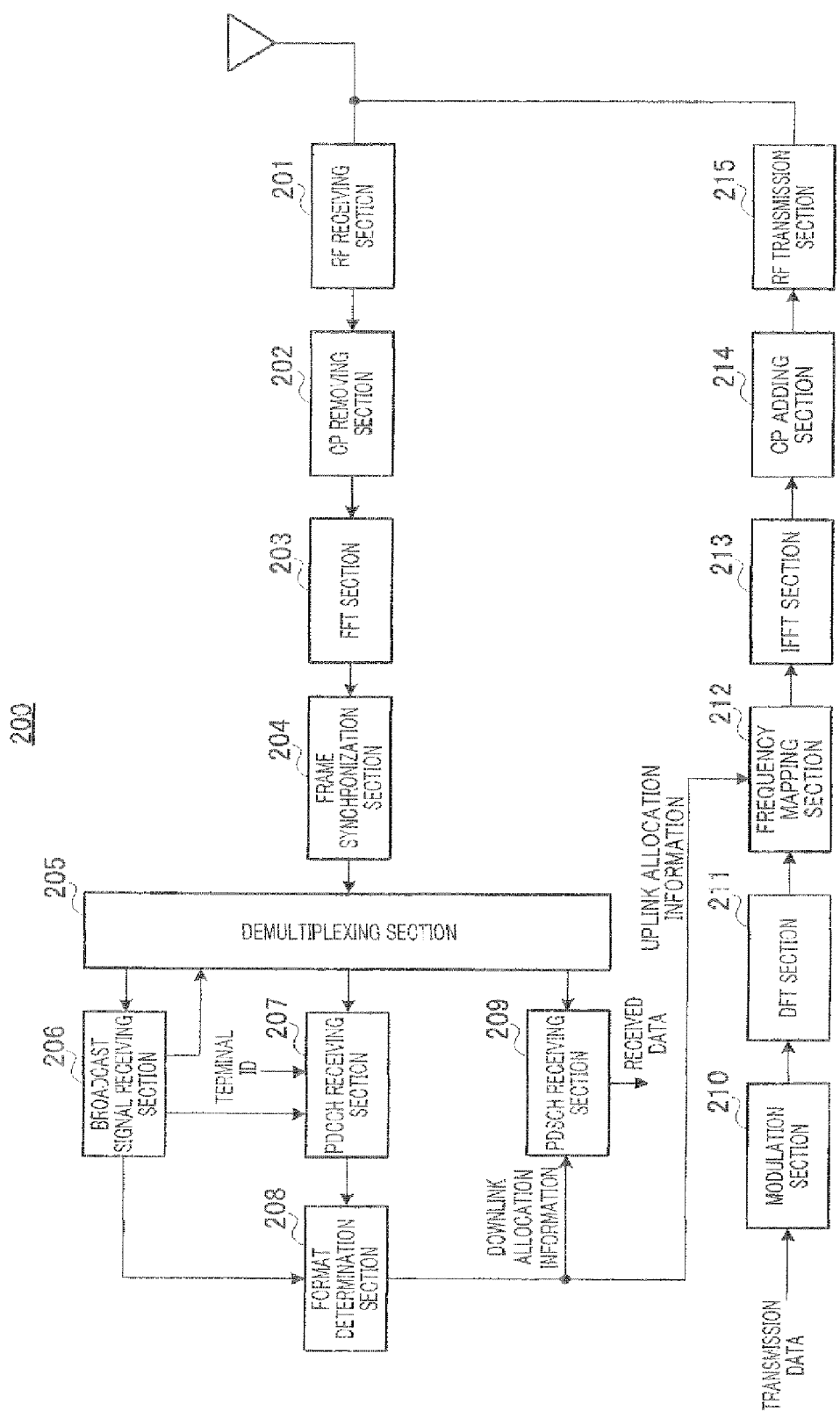
FIG. 3 is a block diagram showing a configuration of a terminal according to Embodiment 1 of the present invention.

FIG. 3 is a block diagram showing the configuration of terminal 200 according to Embodiment 1 of the present invention. In FIG. 3, terminal 200 has RF receiving section 201, CP removing section 202, FFT section 203, frame synchronization section 204, demultiplexing section 205, broadcast signal receiving section 206, PDCCH receiving section 207, format determination section 208, PDSCH receiving section 209, modulation section 210, DFT section 211, frequency mapping section 212, IFFT section 213, CP adding section 214 and RF transmission section 215.

RF receiving section 201 applies reception radio processing (down-conversion, analog-to-digital (A/D) conversion and so forth) to a received radio signal (here, OFDM signal) received in a receiving band via an antenna, and outputs a resultant received signal to CP removing section 202.

CP removing section 202 removes the CP from the received signal, and FFT (fast Fourier transform) section 203 transforms a received signal without a CP to a frequency domain signal. This frequency domain signal is outputted to frame synchronization section 204.

Frame synchronization section 204 searches for an SCH contained in the signal inputted from FFT section 203 and synchronizes with base station 100 (frame synchronization). In addition, frame synchronization section 204 obtains the cell ID associated with an SCH sequence. That is, frame synchronization section 204 performs the same processing as usual cell search. Then, frame synchronization section 204 outputs frame synchronization timing information indicating the frame synchronization timing and the signal inputted from FFT section 203, to demultiplexing section 205.

Demultiplexing section 205 demultiplexes the signal inputted from frame synchronization section 204 into a broadcast signal (i.e., BCH), a control signal (i.e., PDCCH signal) and a data signal (i.e., PDSCH signal), based on the frame synchronization timing information inputted from frame synchronization section 204. Demultiplexing section 205 receives information about downlink component bands from broadcast signal receiving section 206, and extracts a PDCCH signal for each of downlink component bands, based on this information.

Broadcast signal receiving section 206 reads the content of the BCH inputted from demultiplexing section 205, and obtains information about the band (uplink and downlink bands) configuration of base station 100, Broadcast signal receiving section 206 obtains, for example, the number of uplink component bands, the number of downlink component bands, the identification number and bandwidth of each component band, information about association between uplink and downlink component bands, basic component band information and so forth. Here, although it is possible to calculate a basic component band from the bandwidth of an uplink component band and the bandwidth of a downlink component band, base station 100 includes identification information about a basic component band in a BCH. Broadcast signal receiving section 206 outputs the obtained BCH information to format determination section 208 and PDCCH receiving section 207.

PDCCH receiving section 207 performs blind detection on a PDCCH signal in each downlink component band, using the size of resource allocation information corresponding to the bandwidth of each downlink component band, the size of resource allocation information corresponding to the bandwidth of the uplink component band, and the terminal ID of terminal 200.

That is, PDCCH receiving section 207 first determines a basic information size used to process each PDCCH signal, and specifies a part corresponding to CRC bits contained in each PDCCH signal, according to the determined basic information size. At this time, in base station 100, the size of information may be adjusted using zero padding, as described above. Therefore, PDCCH receiving section 207 specifies a part corresponding to CRC bits in a PDCCH signal in a basic component band, using the size of basic information (payload size) determined based on either the bandwidth of the basic component band or the bandwidth of the uplink component band corresponding to the basic component band, whichever is wider. On the other hand, the downlink component band other than the basic component band includes only downlink resource allocation information. Therefore, PDCCH receiving section 207 specifies a part corresponding to CRC bits in the downlink component band other than the basic component band, using the basic information size matching the bandwidth of the downlink component band.

Next, PDCCH receiving section 207 demasks the specified part corresponding to CRC bits with the terminal ID of terminal 200, and, if the result of CRC calculation for the entire PDCCH signal is OK, determines that this PDCCH signal is directed to terminal 200. In this way, the PDCCH signal determined as a signal directed to terminal 200 is outputted to format determination section 208.

Format determination section 208 determines whether the format of the PDCCH signal received from PDCCH receiving section 207, is Format 0 or Format 1A, based on the type information about the resource allocation information included in this PDCCH signal. When determining that the format is Format 0, format determination section 208 outputs the uplink resource allocation information contained in the PDCCH signal to frequency mapping section 212. In addition, when determining that the format is Format 1A, format determination section 208 outputs the downlink resource allocation information contained in the PDCCH signal to PDSCH receiving section 209.

PDSCH receiving section 209 extracts received data from the PDSCH signal inputted from demultiplexing section 205, based on the downlink resource allocation information inputted from format determination section 208.

Modulation section 210 modulates transmission data, and outputs a resultant modulated signal to DFT (discrete Fourier transform) section 211.

DFT section 211 transforms the modulated signal inputted from modulation section 210, and outputs a plurality of resultant frequency components to mapping section 212.

Frequency mapping section 212 maps the plurality of frequency components inputted from DFT section 211 to a PUSCH assigned to the uplink component band.

IFFT section 213 transforms the plurality of mapped frequency components to a time domain waveform, and CP adding section 214 adds a CP to the time domain waveform.

RF transmission section 215 applies transmission radio processing (up-conversion, digital-to-analog (D/A) conversion and so forth) to a signal with the CP, and transmits the result via an antenna.

Figure 4:
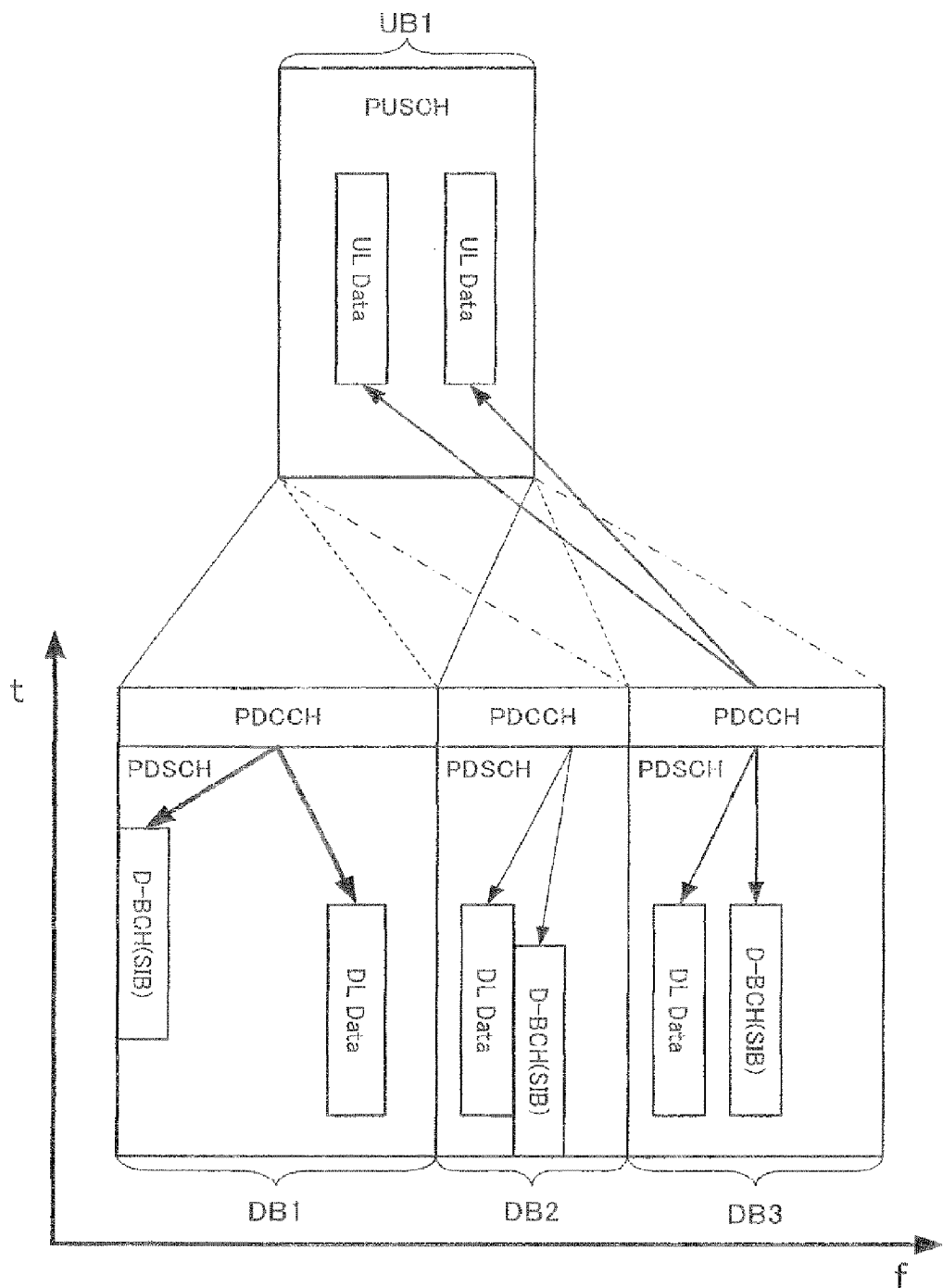
FIG. 4 explains operation of a base station and operation of terminal.

Next, operation of base station 100 and terminal 200 having the above-described configurations will be explained. FIG. 4 explains operation of base station 100 and terminal 200.

In FIG. 4, one uplink component band UB 1 is associated with three downlink component bands DBs 1 to 3. Here, size comparison between the bandwidths of respective component bands as follows. Respective bandwidths of downlink component bands DBs 1 and 3 are wider than the bandwidth of uplink component band UB 1, The bandwidth of downlink component band DB 2 is narrower than the bandwidth of uplink component band UB 1. The bandwidth of downlink component band DB 1 is wider than the bandwidth of downlink component band DB 3. The bandwidth of downlink component band DB 1 is similar to the bandwidth of uplink component band UB 3 more than the downlink component band DB 2. That is, here, downlink component band DB 3 is the basic component band.

Base station 100 allocates uplink component band UB 1 to terminal 200 as an uplink resource, and allocates downlink component bands DBs 1 to 3 as downlink resources.

Then, base station 100 includes uplink resource allocation information and downlink resource allocation information in PDCCH signals and transmits the result to terminal 200.

Here, base station 100 does not include uplink resource allocation information in all PDCCH signals, but includes uplink resource allocation information in only PDCCH signals assigned to part of downlink component bands. On the other hand, downlink resource allocation information is included in all PDCCH signals.

Particularly, with the present embodiment, the basic component band is a downlink component band having the bandwidth which is the most similar to the bandwidth of the uplink component band. Therefore, in FIG. 4, uplink resource allocation information is transmitted in only downlink component band DB 3, which is the basic component band. Here, in FIG. 4, arrows from a PDCCH to uplink data (UL data) mean that uplink resource allocation information is transmitted using the PDCCH. In addition, arrows from each PDCCH to downlink data (DL data) or a D-BCH mean that downlink resource allocation information is transmitted using that PDCCH.

In addition, CRC bits are added to a PDCCH signal in padding section 103. These CRC bits have been masked with the terminal ID assigned to terminal 200.

In addition, adjustment of the size of information is performed on PDCCH signals if necessary. This adjustment of the size of information is performed on a PDCCH signal containing both uplink resource allocation information and downlink resource allocation information (that is, a PDCCH signal in the basic component band) in padding section 103. To be more specific, padding section 103 adds zero information to either downlink resource allocation information or uplink resource allocation information having the smaller size until the downlink resource allocation information and the uplink resource allocation information have the same size. Here, in FIG. 4, the thickness of each arrow represents the size of the corresponding resource allocation information, where uplink resource allocation information and downlink resource allocation information have the same size in the basic component band.

Meanwhile, in terminal 200 that receives PDCCH signals, PDCCH receiving section 207 performs blind detection on PDCCH signals in respective downlink component bands, using the size of resource allocation information corresponding to the bandwidth of each downlink component band, the size of resource allocation information corresponding to the bandwidth of the uplink component band and the terminal ID of terminal 200.

That is, PDCCH receiving section 207 first determines a basic information size used for processing each PDCCH, and specifies a part corresponding to CRC bits contained in a PDCCH signal according to the determined basic information size. To be more specific, in a PDCCH signal in downlink component band DB 3, which is the basic component band, a part corresponding to CRC bits specified using a basic information size (payload size) is determined based on the wider one of the bandwidth of downlink component band DB 3 and the bandwidth of uplink component band UB 1 corresponding to downlink component band DB 3 (that is, the bandwidth of downlink component band DB 3). Meanwhile, PDCCH receiving section 207 specifies a part corresponding to CRC bits in each of the downlink component bands other than the basic component band, using the basic information size according to the bandwidth of each downlink component band. In this way, blind detection processing is switched between the basic component band and the downlink component bands other than the basic component band.

Next, PDCCH receiving section 207 demasks the specified part corresponding to CRC bits with the terminal ID of terminal 200, and, if the result of CRC calculation for the entire PDCCH signal is OK, determines that this PDCCH signal is directed to terminal 200.

Then, format determination section 208 determines whether the format of the PDCCH signal received from PDCCH receiving section 207, is Format 0 or Format 1A, based on the type information about the resource allocation information included in this PDCCH signal.

As described above, according to the present embodiment, PDCCH signals containing uplink resource allocation information are limited to the PDCCH signal assigned to part of downlink component bands, and therefore it is possible to reduce the rate of performing zero padding on downlink resource allocation information having a high degree of importance. Particularly, with the present embodiment, the basic component band is a downlink component band having the bandwidth which is the most similar to the bandwidth of the uplink component band, and therefore it is possible to limit a downlink component band in which zero padding is performed on downlink resource allocation information, to at most one band, that is, the basic component band.

In addition, only downlink resource allocation information is included in PDCCH signals in the downlink component bands other than the basic component band, so that the above-described adjustment of information size is not required. Therefore, it is possible to reduce the rate in which zero padding is performed on downlink resource allocation information. Likewise, it is possible to minimize the number of times of padding and the frequency to perform padding on uplink resource allocation information.

That is, it is possible to minimize the frequency of performing zero padding processing on both uplink resource allocation information and downlink resource allocation information, so that it is possible to improve the quality of both uplink resource allocation information and downlink resource allocation information and also improve system performance.

Moreover, according to the present embodiment, adjustment of the size of information is performed to make downlink resource allocation information and uplink resource allocation information have the same size in a PDCCH signal in the basic component band.

By this means, it is possible to match the position of a part corresponding to CRC bits in a PDCCH signal between downlink resource allocation information and uplink resource allocation information. Therefore, in the receiving side, it is possible to specify a part corresponding to CRC bits without distinguishing between downlink resource allocation information and uplink resource allocation information, based on the information size (payload size) determined based on the wider one of the bandwidth of the basic component band and the bandwidth of the uplink component band corresponding to the basic component band, or the information size determined based on the wider one of downlink resource allocation information determined by the bandwidth of the basic component band or uplink resource allocation information determined by the bandwidth of the uplink component band. That is, it is possible to apply the same blind detection processing to downlink resource allocation information and uplink resource allocation information, and therefore it is possible to prevent increase in the number of times of blind detections.

Embodiment 2

Even if an uplink component band and a downlink component band have the same bandwidth, a case is possible in which downlink resource allocation information and uplink resource allocation information have different sizes, and the present embodiment differs from Embodiment 1 only in that the case is focused.

That is, with Embodiment 1, a case has been explained in which downlink resource allocation information and uplink resource allocation information in a downlink component band as the basic component band, have the same size as long as an uplink component band and a downlink component band have the same bandwidth. By contrast with this, with the present embodiment, even if an uplink component band and a downlink component band have the same bandwidth, downlink resource allocation information and uplink resource allocation information have approximately the same size, but do not have exactly the same size. It is because, when an uplink component band and a downlink component band have the same size, the amount of information required to indicate resource positions is the same, but the amount of information required to report information about other controls differs between downlink resource allocation information and uplink resource allocation information. In addition, when a difference in the bandwidth between an uplink component band and a downlink component band is greater, a difference in the size between downlink resource allocation information and uplink resource allocation information increases.

Therefore, with the present embodiment, in order to make downlink resource allocation information and uplink resource allocation information have the same size, when downlink resource allocation information and uplink resource allocation information have different sizes, zero information is added to resource allocation information allocated to PDCCHs in part of downlink component bands (zero padding).

Now, the present embodiment will be described in detail. Here, the basic configurations of a base station and a terminal according to the present embodiment are the same as the configurations of a base station and a terminal described in Embodiment 1. Therefore, a base station and a terminal according to the present embodiment will be described with reference to FIG. 2 and FIG. 3.

Control section 101 in base station 100 (FIG. 2) according to the present embodiment delivers information size comparison information indicating size comparison between the size of downlink resource allocation information determined by the bandwidth of a basic component band and the size of uplink resource allocation information determined by the bandwidth of an uplink component band, to padding section 103 via PDCCH generating section 102.

Padding section 103 adds zero information to either downlink resource allocation information or uplink resource allocation information having a smaller size until the downlink resource allocation information and uplink resource allocation information have the same size. To which of downlink resource allocation information and uplink resource allocation information is added zero information is determined based on information size comparison information.

Meanwhile, PDCCH receiving section 207 in terminal 200 (FIG. 3) performs blind detection on a PDCCH signal in each downlink component band, using the size of resource allocation information corresponding to the bandwidth of each downlink component band, the size of resource allocation information corresponding to the bandwidth of an uplink component band, and the terminal ID of terminal 200.

That is, PDCCH receiving section 207 first determines a basic information size used for processing each PDCCH, and specifies a part corresponding to CRC bits contained in a PDCCH signal according to the determined basic information size. At this time, in base station 100, adjustment of the size of information may be performed using zero padding as described above. Therefore, PDCCH receiving section 207 specifies a part corresponding to CRC bits in a PDCCH signal in a basic component band, using the greater one of the size of downlink resource allocation information determined based on the bandwidth of the basic component band and the size of uplink resource allocation information determined based on the bandwidth of the uplink component band corresponding to the basic component band, as a basic information size (payload size). On the other hand, the downlink component bands other than the basic component band contain only downlink resource allocation information. Therefore, PDCCH receiving section 207 specifies a part corresponding to CRC bits in each downlink component band other than the basic component band, using the basic information size determined based on the bandwidth of the downlink component band.

Next, operation of base station 100 and terminal 200 having the above described configurations will be described with reference to FIG. 4 like in Embodiment 1.

In FIG. 4, one uplink component band UB 1 is associated with three downlink component bands DBs 1 to 3 like in Embodiment 1. Here, in FIG. 4, size comparison between respective bandwidths of component bands is as follows. Respective bandwidths of downlink component bands DBs 1 and 3 are wider than the bandwidth of uplink component band UB 1. The bandwidth of downlink component band DB 2 is narrower than the bandwidth of uplink component band UB 1. The bandwidth of downlink component band DB 1 is wider than the bandwidth of downlink component band DB 3. The bandwidth of uplink component band UB 1 is similar to the bandwidth of the bandwidth of downlink component band DB 3 more than the bandwidth of downlink component band DB 2. That is, here, downlink component band DB 3 is the basic component band.

Base station 100 allocates uplink component band UB 1 to terminal 200 as an uplink resource and allocates downlink component bands DBs 1 to 3 to terminal 200 as downlink resources.

Then, base station 100 includes uplink resource allocation information and downlink resource allocation information in PDCCH signals and transmits these signals to terminal 200.

Here, base station 100 does not include uplink resource allocation information in all PDCCH signals, but includes uplink resource allocation information in only PDCCH signals assigned to part of downlink component bands. On the other hand, downlink resource allocation information is included in all PDCCH signals.

Particularly, with the present embodiment, the basic component band is a downlink component band having the bandwidth which is the most similar to the bandwidth of the uplink component band. Therefore, in FIG. 4, uplink resource allocation information is transmitted in only downlink component band DB 3, which is the basic component band. Here, in FIG. 4, arrows from a PDCCH to uplink data (UL data) mean that uplink resource allocation information is transmitted using the PDCCH. In addition, arrows from each PDCCH to downlink data (DL data) or a D-BCH mean that downlink resource allocation information is transmitted using the PDCCH.

In addition, CRC bits are added to each PDCCH signal in padding section 103. These CRC bits are masked with the terminal ID assigned to terminal 200.

In addition, adjustment of the size of information is performed on PDCCH signals if necessary.

This adjustment of the size of information is performed on a PDCCH signal containing both uplink resource allocation information and downlink resource allocation information (that is, a PDCCH signal in the basic component band) in padding section 103. To be more specific, padding section 103 adds zero information to either downlink resource allocation information or uplink resource allocation information having a smaller size until the downlink resource allocation information and the uplink resource allocation information have the same size. Here, in FIG. 4, the thickness of each arrow represents the size of the corresponding resource allocation information, where uplink resource allocation information and downlink resource allocation information have the same size in the basic component band.

Meanwhile, in terminal 200 that receives PDCCH signals, PDCCH receiving section 207 performs blind detection on PDCCH signals in respective downlink component bands, using the size of resource allocation information corresponding to the bandwidth of each downlink component band, the size of resource allocation information corresponding to the bandwidth of the uplink component band and the terminal ID of terminal 200.

That is, PDCCH receiving section 207 first determines a basic information size used for processing each PDCCH, and specifies a part corresponding to CRC bits contained in a PDCCH signal according to the determined basic information size. To be more specific, in a PDCCH signal in downlink component band DB 3, which is the basic component band, a part corresponding to CRC bits, using the greater one of the size of downlink resource allocation information determined based on the bandwidth of downlink component band DB 3 and the size of uplink resource allocation information determined based on the bandwidth of uplink component band UB 1 corresponding to downlink component band DB 3, as a basic information size (payload size). Meanwhile, PDCCH receiving section 207 specifies a part corresponding to CRC bits in each of the downlink component bands other than the basic component band, using the basic information size determined based on the bandwidth of each downlink component band. In this way, blind detection processing is switched between the basic component band and the downlink component bands other than the basic component band.

Next, PDCCH receiving section 207 demasks the specified part corresponding to CRC bits with the terminal ID of terminal 200, and, if the result of CRC calculation for the entire PDCCH signal is OK, determines that this PDCCH signal is directed to terminal 200.

Then, format determination section 208 determines whether the format of the PDCCH signal received from PDCCH receiving section 207, is Format 0 or Format 1A, based on the type information about the resource allocation information included in this PDCCH signal.

As described above, according to the present embodiment, PDCCH signals containing uplink resource allocation information are limited to the PDCCH signal assigned to part of downlink component bands like in Embodiment 1, and therefore it is possible to reduce the rate of performing zero padding on downlink resource allocation information having a high degree of importance. Particularly, with the present embodiment, the basic component band is a downlink component band having the bandwidth which is the most similar to the bandwidth of the uplink component band, and therefore it is possible to limit a downlink component band in which zero padding is performed on downlink resource allocation information, to at most one band, that is, the basic component band.

In addition, only downlink resource allocation information is included in PDCCH signals in the downlink component bands other than the basic component band, so that the above-described adjustment of information size is not required. Therefore, it is possible to reduce the rate of performing zero padding on downlink resource allocation information. Likewise, it is possible to minimize the number of times of performing padding and the frequency of performing padding on uplink resource allocation information.

That is, it is possible to minimize the frequency of performing zero padding processing on both uplink resource allocation information and downlink resource allocation information, so that it is possible to improve the quality of both uplink resource allocation information and downlink resource allocation information and also improve system performance.

Embodiment 3

The present embodiment differs from Embodiments 1 and 2 in that a base station variably sets a base component band for each terminal.

That is, in Embodiment 3, at the time a base station starts high-speed communication with a certain terminal using carrier aggregation, the basic component band is set according to the same criterion as in Embodiment 1 or 2. However, with Embodiment 3, a base station can command terminals to add and change the basic component band at any time.

Now, each component and the operation in base station 300 and terminal 400 according to Embodiment 3 of the present invention will be described in detail with reference to FIG. 5 to FIG. 9.

Figure 5:
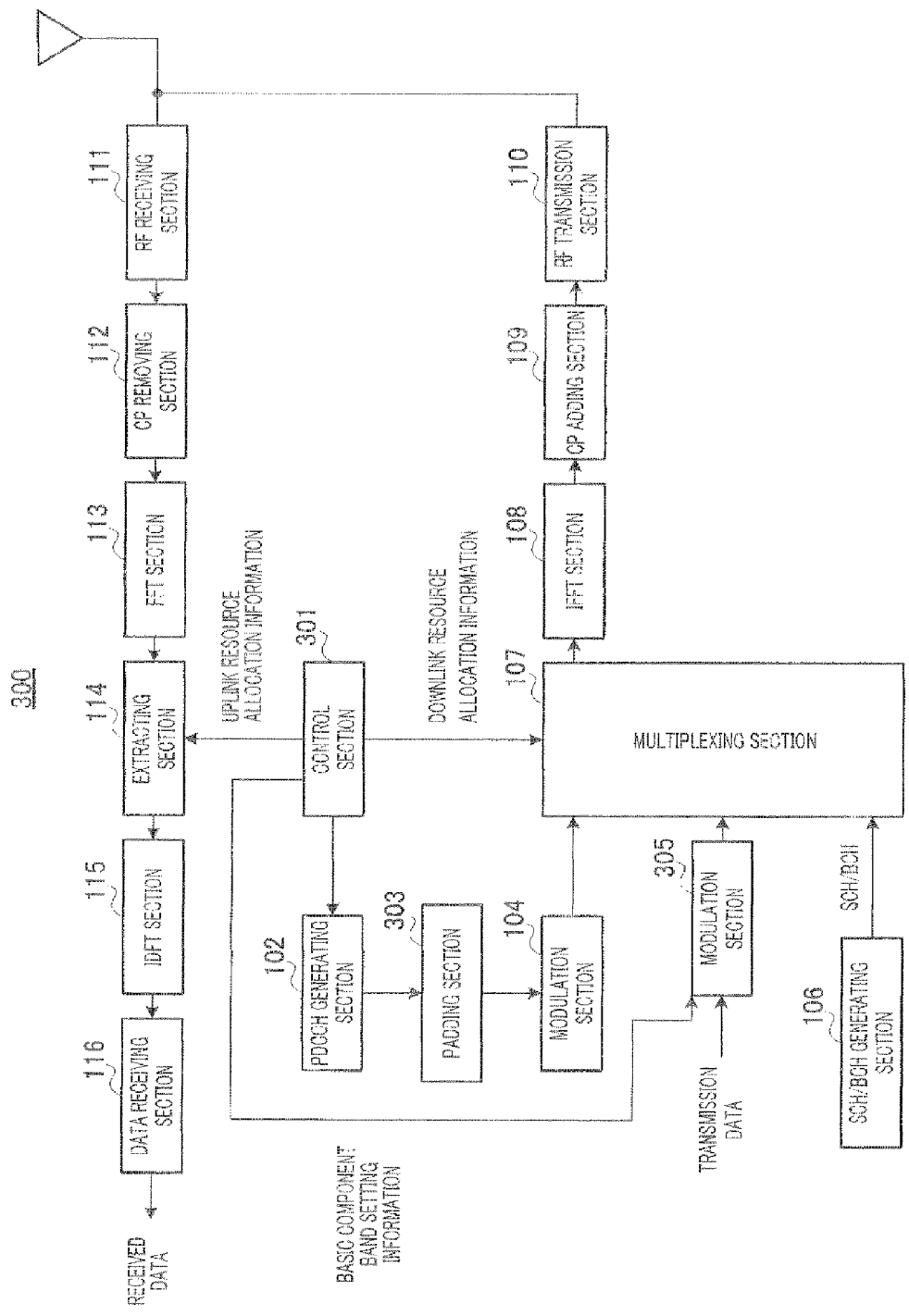
FIG. 5 is a block diagram showing a configuration of a base station according to Embodiment 3 of the present invention.

FIG. 5 is a block diagram showing the configuration of base station 300 according to Embodiment 3 of the present invention. As compared to base station 100 shown in FIG. 2, base station 300 shown in FIG. 5 has control section 301 instead of control section 101, padding section 302 instead of padding section 103 and modulation section 305 Instead of modulation section 105. Here, in FIG. 5, the same components as in FIG. 2 are assigned the same reference numerals and descriptions will be omitted.

Control section 301 in base station 300 according to the present embodiment holds basic component band information, which is set by base station 300, for each terminal 400. Here, a plurality of basic component bands may be set for one terminal 400.

In addition, control section 301 delivers basic component band setting information set for each terminal 400, and "information size comparison information" which represents size comparison between the size of downlink resource allocation information determined based on the bandwidth of each basic component band and the size of uplink resource allocation information determined based on the bandwidth of the uplink component band, to padding section 303 via PDCCH generating section 102.

Moreover, when changing the basic component band setting information set for terminal 400, in order to transmit the thing as data for terminal 400, control section 301 outputs new "basic component band setting information" to modulation section 305.

Padding section 303 adds zero information to either downlink resource allocation information or uplink resource allocation information having the smaller size until the downlink resource allocation information and the uplink resource allocation information have the same size. To which of downlink resource allocation information and uplink resource allocation information is added zero information is determined based on information size comparison information. Resource allocation information to which zero information is added is outputted to modulation section 104 if necessary.

When receiving the basic component band setting information for terminal 300, modulation section 305 modulates that information as part of transmission data to terminal 300 and outputs the result to multiplexing section 107.

Figure 6:
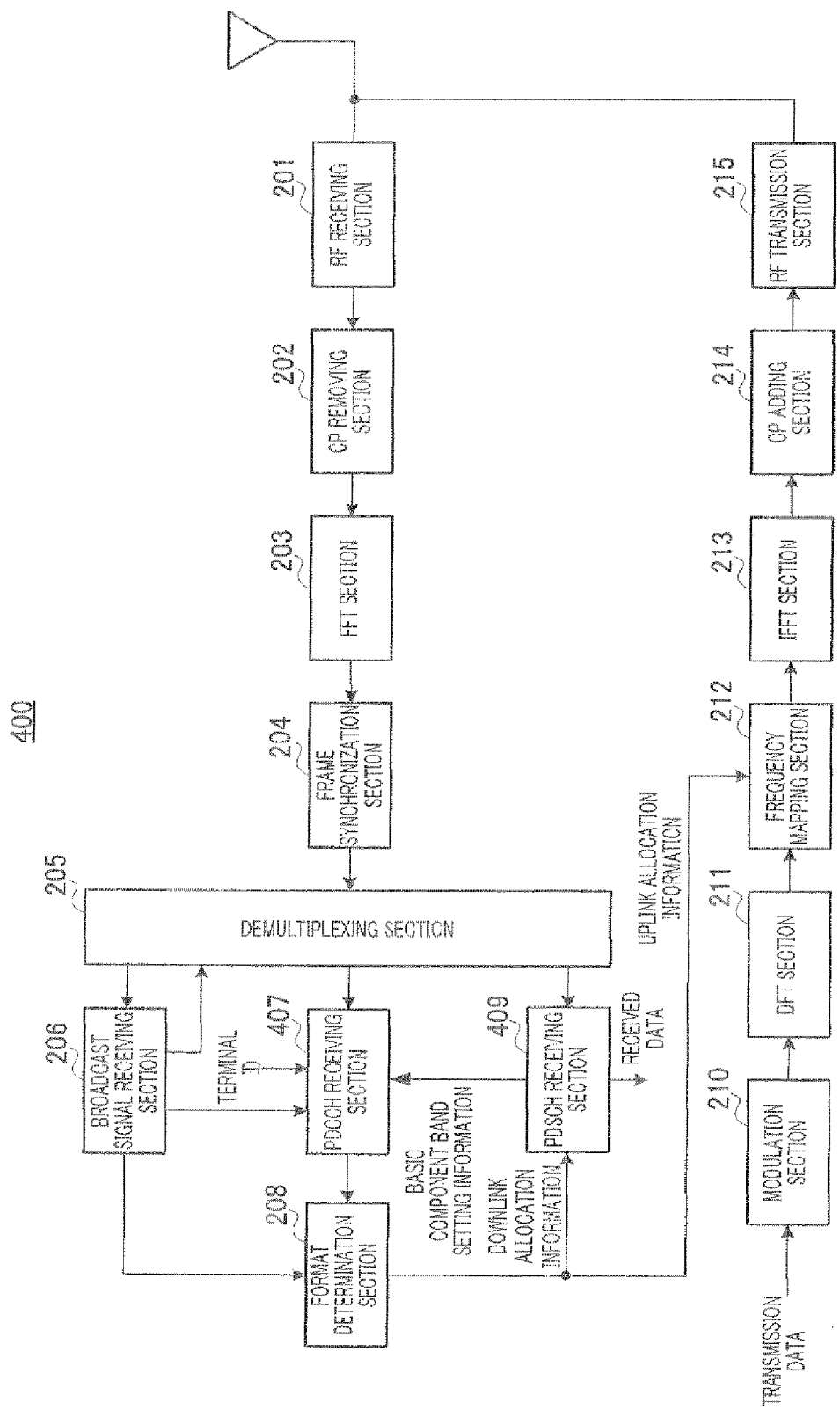
FIG. 6 is a block diagram showing a configuration of a terminal according to Embodiment 3 of the present invention.

FIG. 6 is a block diagram showing the configuration of terminal 400 according to Embodiment 3 of the present invention. As compared to terminal 200 according to Embodiment 1 shown in FIG. 3, terminal 400 shown in FIG. 6 has PDCCH receiving section 407 instead of PDCCH receiving section 207 and has PDSCH receiving section 409 instead of PDSCH receiving section 209. Here, in FIG. 6, the same components as in FIG. 3 are assigned the same reference numerals and descriptions will be omitted.

PDCCH receiving section 407 in terminal 400 according to the present embodiment performs blind detection on PDCCH signals in respective downlink component bands, using the size of resource allocation information corresponding to the bandwidth of each downlink component band, the size of resource allocation information corresponding to the bandwidth of the uplink component band and the terminal ID of terminal 400.

That is, PDCCH receiving section 407 first determines a basic information size used to process each PDCCH, and specifies a part corresponding to CRC bits contained in a PDCCH signal according to the determined basic information size. At this time, in base station 300, adjustment of the size of information may be performed using zero padding as described above. Therefore, PDCCH receiving section 407 specifies a part corresponding to CRC bits in a PDCCH signal in each basic component band, using the greater one of the size of downlink resource allocation information determined based on the bandwidth of each basic component band and the size of uplink resource allocation information determined based on the bandwidth of the uplink component band corresponding to the basic component band, as a basic information size (payload size). On the other hand, the downlink component bands other than the basic component band contain only downlink resource allocation information. Therefore, PDCCH receiving section 407 specifies a part corresponding to CRC bits in each downlink component band other than the basic component band, using the basic information size determined based on the bandwidth of the downlink component band.

In addition, PDCCH receiving section 407 determines a plurality of basic component bands described above, according to basic component band setting information inputted from PDSCH receiving section 409.

PDSCH receiving section 409 extracts received data from a PDSCH signal inputted from demultiplexing section 205, based on downlink resource allocation information inputted from format determination section 208. Here, when the received data contains information reporting change in the basic component band setting, PDSCH receiving section 409 outputs that information to PDCCH receiving section 407 as new basic component band setting information.

Next, operation of base station 300 and terminal 400 having the above-described configurations will be described using FIG. 7 to FIG. 9 as support.

Figure 7:
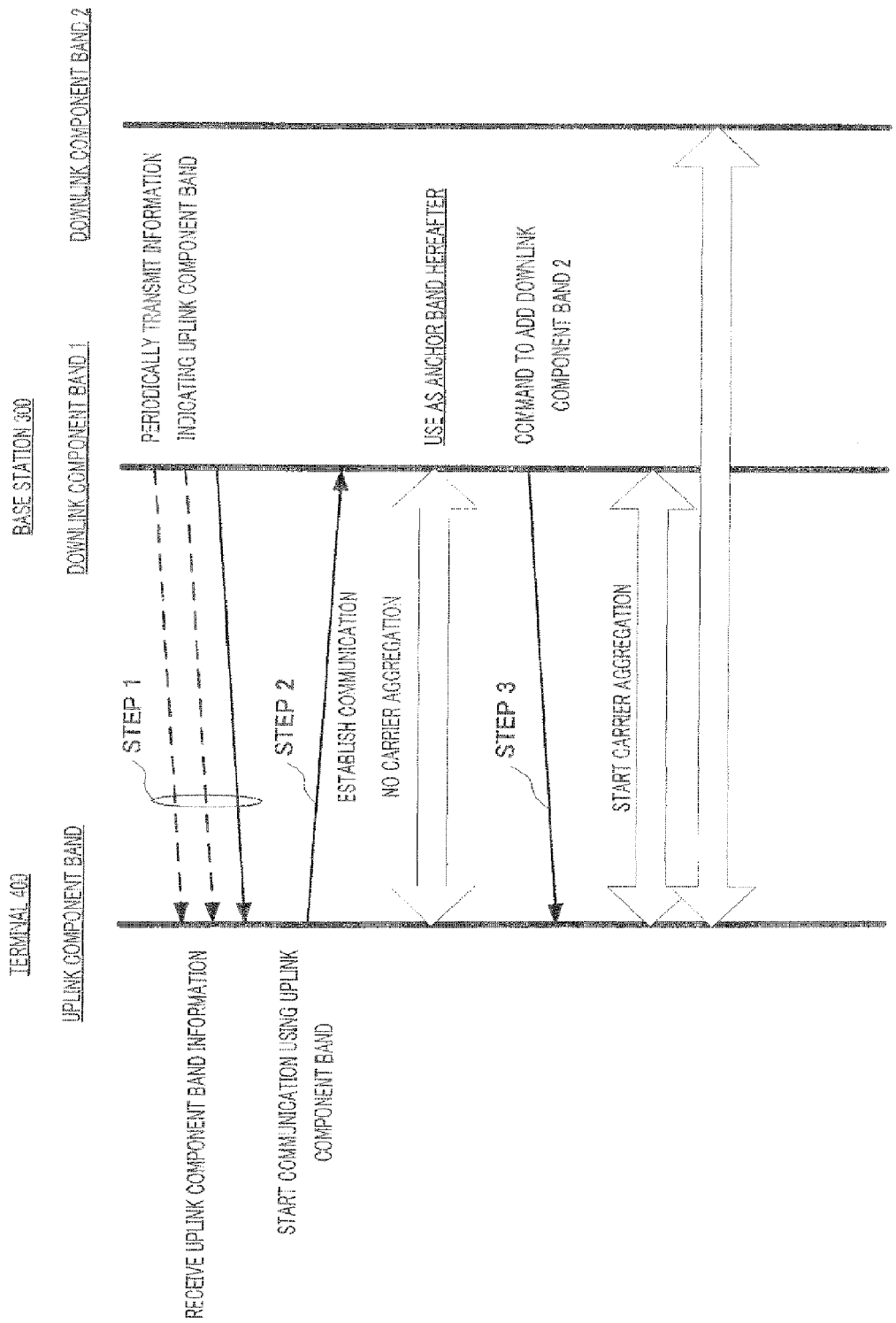
FIG. 7 shows a sequence when a base station and a terminal start carrier aggregation communication.

FIG. 7 shows a sequence when base station 300 and terminal 400 start carrier aggregation communication. As shown in FIG. 7, base station 300 periodically transmits uplink component band information using a certain downlink component band (downlink component band 1 in FIG. 7) (step 1). When successfully receiving the uplink component band information from base station 300, terminal 400 requests to start communication with base station 300 using that uplink component band, and therefore starts communication with base station 300 (step 2). In this case, only one downlink component band and one uplink component band are set for terminal 400, and therefore, this downlink component band (downlink component band 1 in FIG. 7) is set for base station 300 and terminal 400 as the basic component band.

After communication between base station 300 and terminal 400 is established, when base station 300 sets aggregation communication with terminal 400, depending on the situation of communication traffic, base station 300 reports that downlink component band 2 is used in communication with terminal 400, to terminal 400 individually, so that carrier aggregation communication is set between base station 300 and terminal 400 (step 3). This individual report (dedicated signaling) to terminal 400 includes, for example, plurality of information elements including the frequency position and frequency bandwidth of a component band newly added (i.e., downlink component band 2), information indicating whether or not the component band newly added is set as the basic component band, and so forth. Here, at this time, only one uplink component band is set, and therefore two component bands used in carrier aggregation are both associated with that uplink component band.

Figure 8:
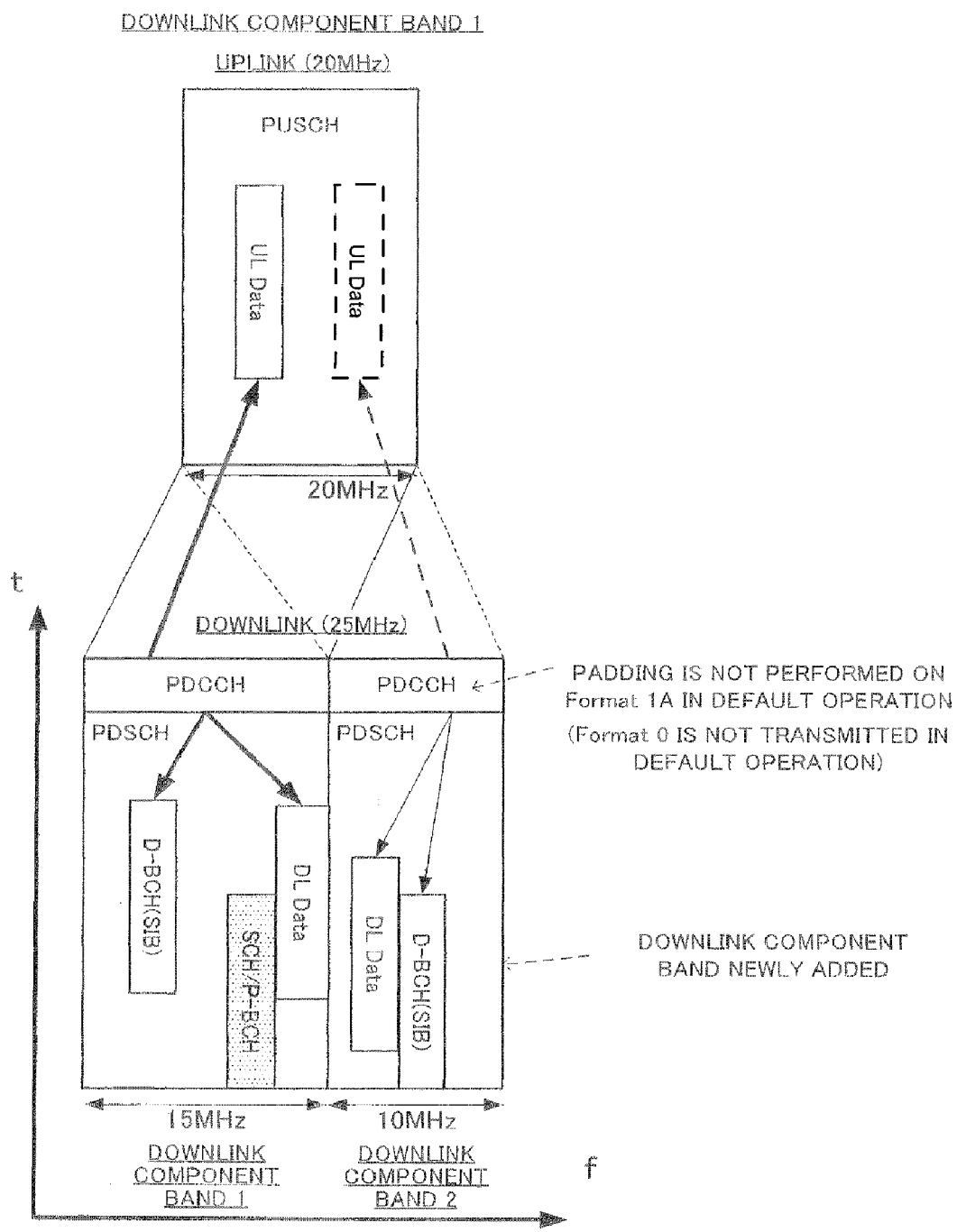
FIG. 8 is a conceptual diagram showing operation in a newly added downlink component band.
Figure 9:
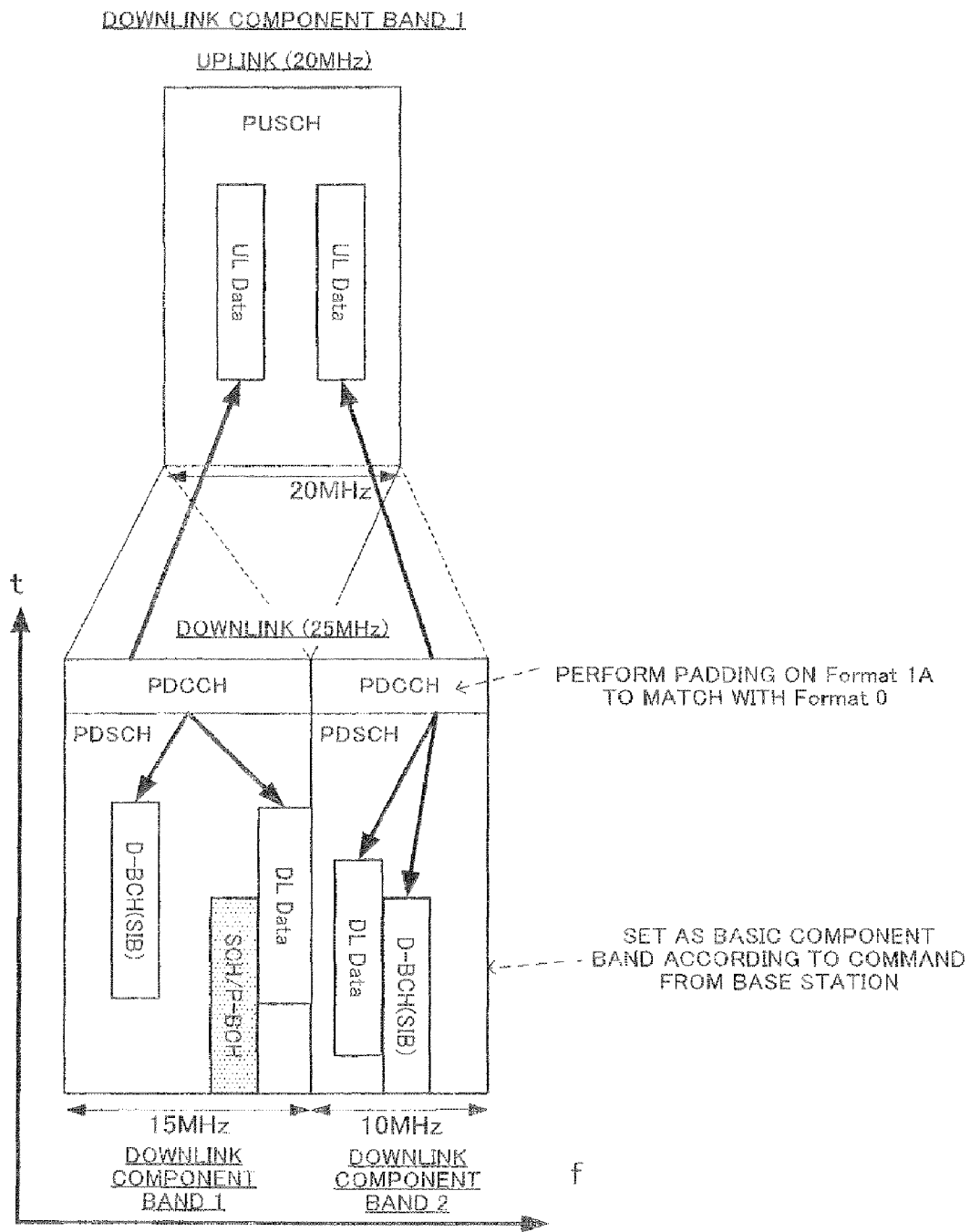
FIG. 9 is a conceptual diagram showing operation in the basic component band set according to a command from a base station.

Next, FIG. 8 is a conceptual diagram showing operation in the above-described downlink component band newly added. In FIG. 8, the bandwidth of downlink component band 1 originally used in communication is 15 MHz, and the bandwidth of downlink component band 2 newly added is 10 MHz, where both bandwidths are smaller than the bandwidth (20 MHz) of uplink component band 1.

As shown in FIG. 7, in the initial state in which terminal 400 starts communication with base station 300 (that is, before carrier aggregation communication is set: step 2), only one downlink component band is set for terminal 400, so that downlink component band 1 is the basic component band for terminal 400 regardless of size comparison with the bandwidth of the uplink component band.

By contrast with this, when carrier aggregation communication is started between base station 300 and terminal 400 (step 3 in FIG. 8), whether or not a downlink component band newly added is set as the basic component band is determined based on whether or not information elements contained in dedicated signaling from base station 300 include basic component band setting information. That is, a flow of adding a downlink component band is different from a flow of determining an added downlink component band as the basic component band.

To be more specific, if there is an information element containing basic component band setting information in dedicated signaling transmitted from base station 300 to terminal 400 at the time of starting carrier aggregation, a downlink component band newly added is set as the basic component band without any conditions.

On the other hand, if there is no information element containing basic element band setting information in the above-described dedicated signaling, whether or not a downlink component band newly added is the basic component band is determined in the terminal 400 side, based on "specified default configuration"). That is, in order to determine whether or not a component band newly added is set as the basic component band, terminal 400 compares between the size of downlink resource allocation information determined based on the bandwidth of the component band newly added (i.e., downlink component band 2) and the size of uplink resource allocation information determined based on the bandwidth of uplink component band 1. Then, as the result of the comparison, when the size of the downlink resource allocation information is equal to or greater than the size of the uplink resource allocation information, terminal 400 sets the downlink component band newly added as the basic component band, and, on the other hand, when the size of the uplink resource allocation information is greater than the size of the downlink resource allocation information, does not set the downlink component band newly added, as the basic component band. In FIG. 8, the size of the uplink resource allocation information is greater, and therefore the downlink component band newly added is not set as the basic component band.

That is, base station 300 determines whether or not to transmit Format 0 from the newly added downlink band to terminal 400 as default setting, based on the above-described comparison result. In addition, PDCCH receiving section 407 in terminal 400 determines the size of downlink resource allocation information, based on the above-described comparison result.

Here, even if the basic component band is set in the initial state in which carrier aggregation is started between base station 300 and terminal 400 as described above, after that, base station 300 reports an information element containing basic component band setting information to terminal 400 individually, depending on situations, and therefore can change whether or not downlink component band 2 is the basic component band for terminal 400. Then, when downlink component band 2 is set as the basic component band, base station 300 matches the size of Format 1A with the size of Format 0 in downlink component band 2, by means of padding.

Moreover, when receiving a report that downlink component band 2 is the basic component band, from base station 300, PDCCH receiving section 407 in terminal 400 determines the size of downlink resource allocation information assume that the size of Format 1A is the same as the size of Format 0 in downlink component band 2 by padding.

As described above, according to the present embodiment, default setting of whether or not a downlink component band newly added at the time of starting carrier aggregation is set as the basic component band, is specified based on comparison between the size of downlink resource allocation information determined based on the bandwidth of the downlink component band newly added and the size of uplink resource allocation information determined based on the bandwidth of the uplink component band. Accordingly, it is possible to realize preferable operation for the performance of Format 1A. Moreover, base station 300 optionally changes setting of the basic component band for each terminal 400, depending on information of communication traffic.

That is, as default operation, only when the information size determined based on the bandwidth of a downlink component band newly added at the time of starting carrier aggregation is equal to or greater than the information size determined based on the bandwidth of the uplink component band associated with that downlink component band, control section 301 in base station 300 determines that downlink component band as the basic component band. In other words, when a communication component band is added to the initial communication component band, control section 301 sets, as default operation, only a downlink component band having a size greater than the information size determined based on the bandwidth of the uplink component band associated with that downlink component band, as the basic component band. By this means, it is possible to prevent padding on downlink resource allocation information in a downlink component band newly added, without signaling to the terminal.

Another Embodiment (1) With Embodiments 1 and 2, downlink component bands satisfying the following conditions may be selected as the basic component band. That is, first, a downlink component band having a bandwidth equal to or greater than the bandwidth of the uplink component band may be selected as the basic component band. By this means, it is possible to eliminate zero padding due to the size comparison between the bandwidths with respect to downlink resource allocation information. In addition, secondly, a downlink component band having a bandwidth, which is equal to or more than the bandwidth of the uplink component band and which is the most similar to the bandwidth of the uplink component band, may be selected as the basic component band. By this means, also it is possible to eliminate zero padding due to the size comparison between the bandwidths.

(2) In addition, an LTE-A base station needs to support both LTE terminals and LTE-A terminals. As described above, however, an LTE terminal can perform communication in only one component band at a time. When communicating with base station 100, an LTE terminal needs uplink resource allocation information and downlink resource allocation information, naturally. Therefore, an LTE terminal cannot be allocated to downlink component bands other than the basic component band, to which only downlink resource allocation information are transmitted, but can be allocated to only the basic component band. Therefore, when base station 100 according to Embodiments 1 and 2 is an LTE-A base station, the basic component band may be a band in which an LTE-A terminal and an LTE terminal can exist together.

Figure 10:
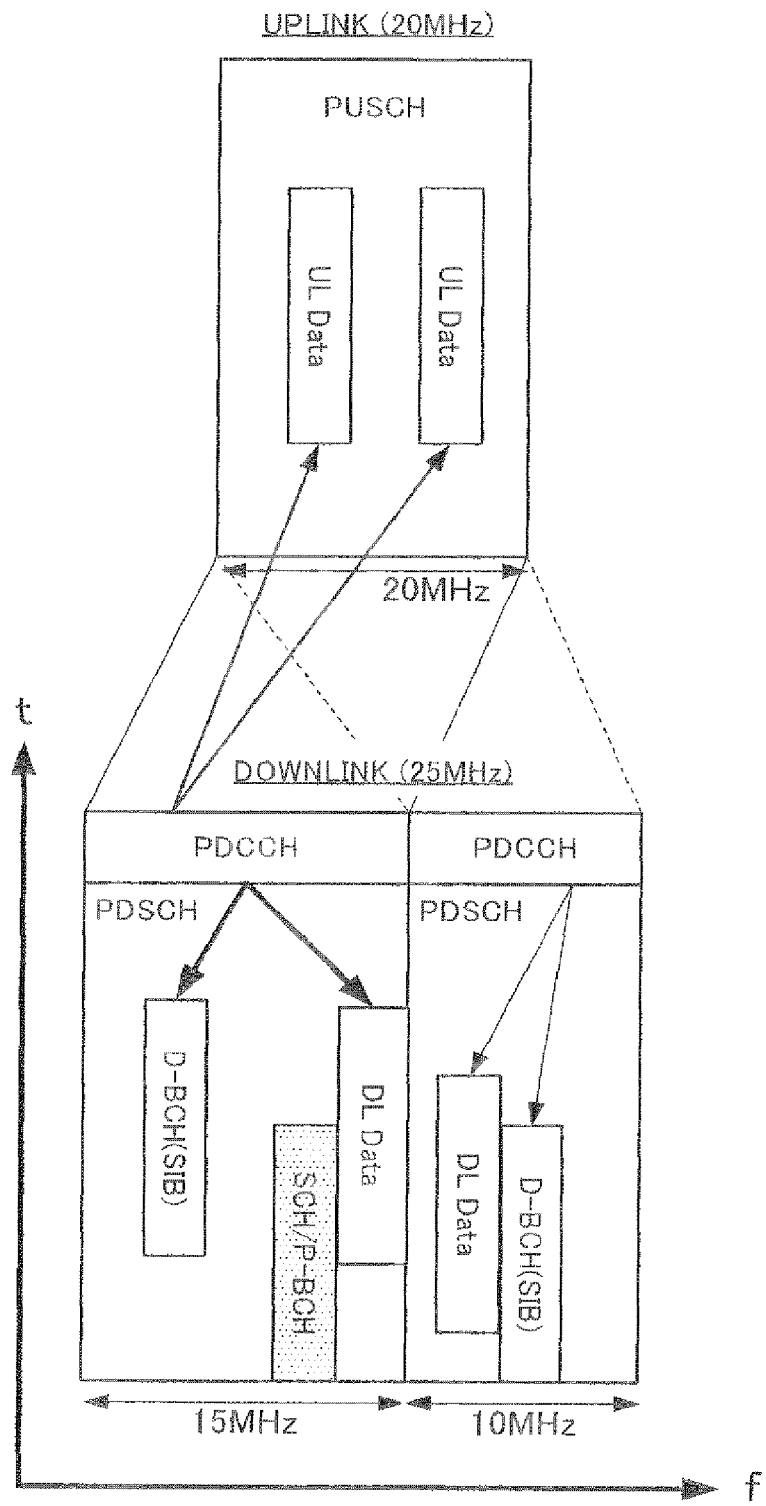
FIG. 10 shows an arrangement example of channels in an LTE-A system in which the communication bandwidth (the number of component bands) of the uplink is not symmetrical to that of the downlink.

An SCH and a P-BCH for at least an LTE terminal are transmitted in a band in which an LTE-A terminal and an LTE terminal can exist together in an LTE-A system, as shown in FIG. 10. These SCH and P-BCH for an LTE terminal are used by an LTE-A terminal.

Therefore, in an LTE-A system, terminal 200 according to Embodiments 1 and 2 can determine whether or not a certain downlink component band is the basic component band, based on whether or not the downlink component band can receive an SCH and a P-BCH for an LTE terminal as a criterion for determination. Based on the result of the determination, terminal 200 can switch blind detection processing between the basic component band and the other downlink component bands as described above.

In addition, in Embodiments 1 and 2, when information about a coexisting band is reported to terminals by broadcast information such as a BCH, the basic component band may be specified based on the information about the coexisting band. Moreover, information about a coexisting band is not limited to broadcast information, and may be reported to each terminal using a dedicated channel.

(3) Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-281388 filed on Oct. 31, 2008 and Japanese Patent Application No. 2009-083043 filed on Mar. 30, 2009, including the specifications, drawings and abstracts, are incorporated herein by reference in their entirety.

INDUSTRIAL APPLICABILITY

The radio terminal apparatus, the radio base station apparatus and the channel signal forming method according to the present invention are useful to prevent deterioration of the quality in downlink resource allocation information by reducing the frequency of processing including adding zero information to downlink resource allocation information when an uplink component band and a plurality of downlink component bands associated with the uplink component band.

The invention claimed is:
1. A communication apparatus comprising:
a receiver which, in operation, receives from a communication partner apparatus a first downlink control signal over a basic downlink component carrier and a second downlink control signal over another downlink component carrier, wherein the first downlink control signal includes uplink resource allocation information related to a resource allocation of an uplink component carrier and first downlink resource allocation informa- tion related to a resource allocation of the basic downlink component carrier, and the second downlink control signal includes second downlink resource allocation information related to a resource allocation of the another downlink component carrier, wherein for the first downlink control signal when a number of uplink information bits necessary to transmit the uplink resource allocation information is different from a number of downlink information bits necessary to transmit the first downlink resource allocation information, zeros are appended by the communication partner apparatus to a smaller one of the uplink resource allocation information and the first downlink resource allocation information until a payload size of the smaller one equals a payload size of a larger one, and Cyclic Redundancy Check (CRC) bits are further added by the communication partner apparatus to the uplink resource allocation information and the first downlink resource allocation information; and a decoder which, in operation, uses the payload size of the larger one of the uplink resource allocation information and the first downlink resource allocation information in decoding processing of the first downlink control signal.

2. The communication apparatus according to claim 1, wherein the decoder, in operation, determines the added CRC bits based on the payload size of the larger one of the uplink resource allocation information and the first downlink resource allocation information.

3. The communication apparatus according to claim 2, wherein the decoder, in operation, verifies based on the added CRC bits whether the first downlink control signal including the uplink resource allocation information and the basic downlink resource allocation information is directed to the communication apparatus.

4. The communication apparatus according to claim 1, wherein a bandwidth of the basic downlink component carrier, a bandwidth of the another downlink component carrier, and a bandwidth of the uplink component carrier are set independently of each other.

5. The communication apparatus according to claim 1, wherein the number of downlink information bits necessary to transmit the first downlink resource allocation information is determined based on a bandwidth of the basic downlink component carrier, and the number of uplink information bits necessary to transmit the uplink resource allocation information is determined based on a bandwidth of the uplink component carrier.

6. The communication apparatus according to claim 1, wherein the payload size of the larger one of the uplink resource allocation information and the first downlink resource allocation information equals a greater one of the number of downlink information bits necessary to transmit the first downlink resource allocation information and the number of uplink information bits necessary to transmit the uplink resource allocation information.

7. The communication apparatus according to claim 1, wherein the another downlink component carrier is a newly added component carrier.

8. The communication apparatus according to claim 1, wherein the basic downlink component carrier is a downlink component carrier having a smallest bandwidth among a plurality of downlink component carriers having larger bandwidths than a bandwidth of the uplink component carrier.

9. A communication method comprising:

receiving from a communication partner apparatus a first downlink control signal over a basic downlink component carrier and a second downlink control signal over another downlink component carrier, wherein the first downlink control signal includes uplink resource allocation information related to a resource allocation of an uplink component carrier and first downlink resource allocation information related to a resource allocation of the basic downlink component carrier, and the second downlink control signal includes second downlink resource allocation information related to a resource allocation of the another downlink component carrier, wherein for the first downlink control signal when a number of uplink information bits necessary to transmit the uplink resource allocation information is different from a number of downlink information bits necessary to transmit the first downlink resource allocation information, zeros are appended by the communication partner apparatus to a smaller one of the uplink resource allocation information and the first downlink resource allocation information until a payload size of the smaller one equals a payload size of a larger one, and Cyclic Redundancy Check (CRC) bits are further added by the communication partner apparatus to the uplink resource allocation information and the first downlink resource allocation information; and using the payload size of the larger one of the uplink resource allocation information and the first downlink resource allocation information in decoding processing of the first downlink control signal.

10. The communication method according to claim 9, wherein the decoding includes determining the added CRC bits based on the payload size of the larger one of the uplink resource allocation information and the first downlink resource allocation information.

11. The communication method according to claim 10, wherein the decoding includes verifying based on the added CRC bits whether the first downlink control signal including the uplink resource allocation information and the basic downlink resource allocation information is directed to the communication apparatus itself.

12. The communication method according to claim 9, wherein a bandwidth of the basic downlink component carrier, a bandwidth of the another downlink component carrier, and a bandwidth of the uplink component carrier are set independently of each other.

13. The communication method according to claim 9, wherein the number of downlink information bits necessary to transmit the first downlink resource allocation information is determined based on a bandwidth of the basic downlink component carrier, and the number of uplink information bits necessary to transmit the uplink resource allocation information is determined based on a bandwidth of the uplink component carrier.

14. The communication method according to claim 9, wherein
   the payload size of the larger one of the uplink resource allocation information and the first downlink resource allocation information equals a greater one of the number of downlink information bits necessary to transmit the first downlink resource allocation information and the number of uplink information bits necessary to transmit the uplink resource allocation information.

15. The communication method according to claim 9, wherein
   the another downlink component carrier is a newly added component carrier.

16. The communication method according to claim 9, wherein
   the basic downlink component carrier is a downlink component carrier having a smallest bandwidth among a plurality of downlink component carriers having larger bandwidths than a bandwidth of the uplink component carrier.

\* \* \* \* \*